United States Patent
Klein

(10) Patent No.: US 10,035,290 B2
(45) Date of Patent: Jul. 31, 2018

(54) EXTRUSION BLOW-MOLDING METHOD AND DEVICE FOR THE PERFORMANCE THEREOF

(71) Applicant: KAUTEX MASCHINENBAU GMBH, Bonn (DE)

(72) Inventor: Martin Klein, Sankt Augustin (DE)

(73) Assignee: KAUTEX MASCHINENBAU GMBH, Bonn (DE)

( * ) Notice: Subject to any disclaimer, the term of this patent is extended or adjusted under 35 U.S.C. 154(b) by 389 days.

(21) Appl. No.: 14/649,155

(22) PCT Filed: Nov. 29, 2013

(86) PCT No.: PCT/EP2013/075127
§ 371 (c)(1),
(2) Date: Jun. 2, 2015

(87) PCT Pub. No.: WO2014/090607
PCT Pub. Date: Jun. 19, 2014

(65) Prior Publication Data
US 2015/0314515 A1    Nov. 5, 2015

(30) Foreign Application Priority Data

Dec. 11, 2012    (DE) .................. 10 2012 112 110

(51) Int. Cl.
*B29C 49/04*    (2006.01)
*B29C 49/42*    (2006.01)
(Continued)

(52) U.S. Cl.
CPC .............. *B29C 47/54* (2013.01); *B29C 47/92* (2013.01); *B29C 49/041* (2013.01);
(Continued)

(58) Field of Classification Search
CPC    B29C 2949/78756; B29C 2949/78243; B29C 2947/92409; B29C 2947/92857;
(Continued)

(56) References Cited

U.S. PATENT DOCUMENTS 3,262,154 A    7/1966 Valyi
3,611,494 A    10/1971 Feuerherm
(Continued)

FOREIGN PATENT DOCUMENTS

CN    201179724 Y    1/2009
DE    1554968 A1    1/1970
(Continued)

OTHER PUBLICATIONS

International Bureau Notification with translation of the International Preliminary Report on Patentability, dated Jun. 11, 2015, 6 pages.

*Primary Examiner* — Robert J Grun
*Assistant Examiner* — Jerzi H Moreno Hernandez
(74) *Attorney, Agent, or Firm* — Lucas & Mercanti, LLP

(57) ABSTRACT

An extrusion blow molding method includes detecting an exit velocity of a tube exiting a head during a blow molding cycle for forming the tube. A melt accumulator receives part of the melt conveyed by an extruder or discharges melt in addition to the melt conveyed by the extruder in dependence on the detected exit velocity. The melt accumulator discharges melt if the detected exit velocity is less than a target value for the exit velocity and receives melt if the detected exit velocity is greater than the target value for the exit velocity.

14 Claims, 1 Drawing Sheet

(51) Int. Cl.
  *B29C 49/78* (2006.01)
  *B29C 47/54* (2006.01)
  *B29C 47/92* (2006.01)
  *B29L 31/00* (2006.01)
  *B29K 101/12* (2006.01)
  *B29K 105/00* (2006.01)
  *B29C 47/00* (2006.01)

(52) U.S. Cl.
  CPC .......... *B29C 49/4205* (2013.01); *B29C 49/78* (2013.01); *B29C 47/0023* (2013.01); *B29C 47/0054* (2013.01); *B29C 49/04* (2013.01); *B29C 2049/044* (2013.01); *B29C 2793/0027* (2013.01); *B29C 2947/926* (2013.01); *B29C 2947/92066* (2013.01); *B29C 2947/92104* (2013.01); *B29C 2947/92409* (2013.01); *B29C 2947/92857* (2013.01); *B29C 2949/78058* (2013.01); *B29C 2949/78243* (2013.01); *B29C 2949/78571* (2013.01); *B29C 2949/78756* (2013.01); *B29K 2101/12* (2013.01); *B29K 2105/258* (2013.01); *B29L 2031/717* (2013.01); *B29L 2031/7158* (2013.01)

(58) Field of Classification Search
  CPC   B29C 2947/92066; B29C 2949/78042; B29C 47/0023; B29C 2947/92142; B29C 2947/92638; B29C 2949/78084; B29C 2949/78596; B29C 49/04; B29C 47/0054; B29C 47/54; B29C 49/4205; B29C 49/041; B29C 2049/044; B29C 2949/78571; B29C 2949/78058; B29C 2947/92104; B29C 2947/926; B29C 2793/0027; B29L 2031/7158; B29L 2031/717; B29K 2105/258; B29K 2101/12
  See application file for complete search history.

(56) References Cited

U.S. PATENT DOCUMENTS

| | | | | |
|---|---|---|---|---|
| 3,759,648 | A * | 9/1973 | Hunkar | B29C 47/22 264/40.7 |
| 3,865,528 | A * | 2/1975 | Roess | B29C 47/22 425/145 |
| 3,943,214 | A * | 3/1976 | Turek | B29C 49/04 264/40.7 |
| 4,094,620 | A | 6/1978 | Daubenbuschel | |
| 4,159,293 | A * | 6/1979 | Fukase | B29C 47/368 264/40.5 |
| 4,224,561 | A * | 9/1980 | Handte | B29C 47/20 198/524 |
| 4,338,071 | A | 7/1982 | Daubenbuechel | |
| 4,444,702 | A | 4/1984 | Thomas | |
| 4,474,716 | A * | 10/1984 | Daubenbuchel | B29C 47/22 264/40.1 |
| 4,959,001 | A * | 9/1990 | Langlois | B29C 47/20 264/40.7 |
| 5,130,630 | A * | 7/1992 | Handte | B29C 47/22 318/567 |
| 5,399,302 | A * | 3/1995 | Noguchi | B29C 49/70 264/40.7 |
| 5,409,647 | A * | 4/1995 | Kiefer | B29C 47/20 264/40.1 |

FOREIGN PATENT DOCUMENTS

| | | | |
|---|---|---|---|
| DE | 1704791 A1 | 5/1971 | |
| DE | 2544171 A1 | 4/1977 | |
| DE | 2544609 A1 | 4/1977 | |
| DE | 4226467 C1 | 4/1993 | |
| DE | 4423381 A1 | 1/1996 | |
| DE | 10217311 A1 | 11/2003 | |
| DE | 102004015719 A1 | 10/2004 | |
| EP | 0334448 A2 | 9/1989 | |
| EP | 1354692 A1 | 10/2003 | |
| ES | 2161801 T3 * | 12/2001 | ......... B29C 47/0023 |
| JP | S50075250 A | 6/1975 | |
| JP | S58090928 A | 5/1983 | |
| JP | S62202712 A | 9/1987 | |
| JP | H04312833 A | 11/1992 | |
| JP | H05200838 A | 8/1993 | |
| JP | H06270242 A | 9/1994 | |
| JP | H07088945 A | 4/1995 | |

* cited by examiner

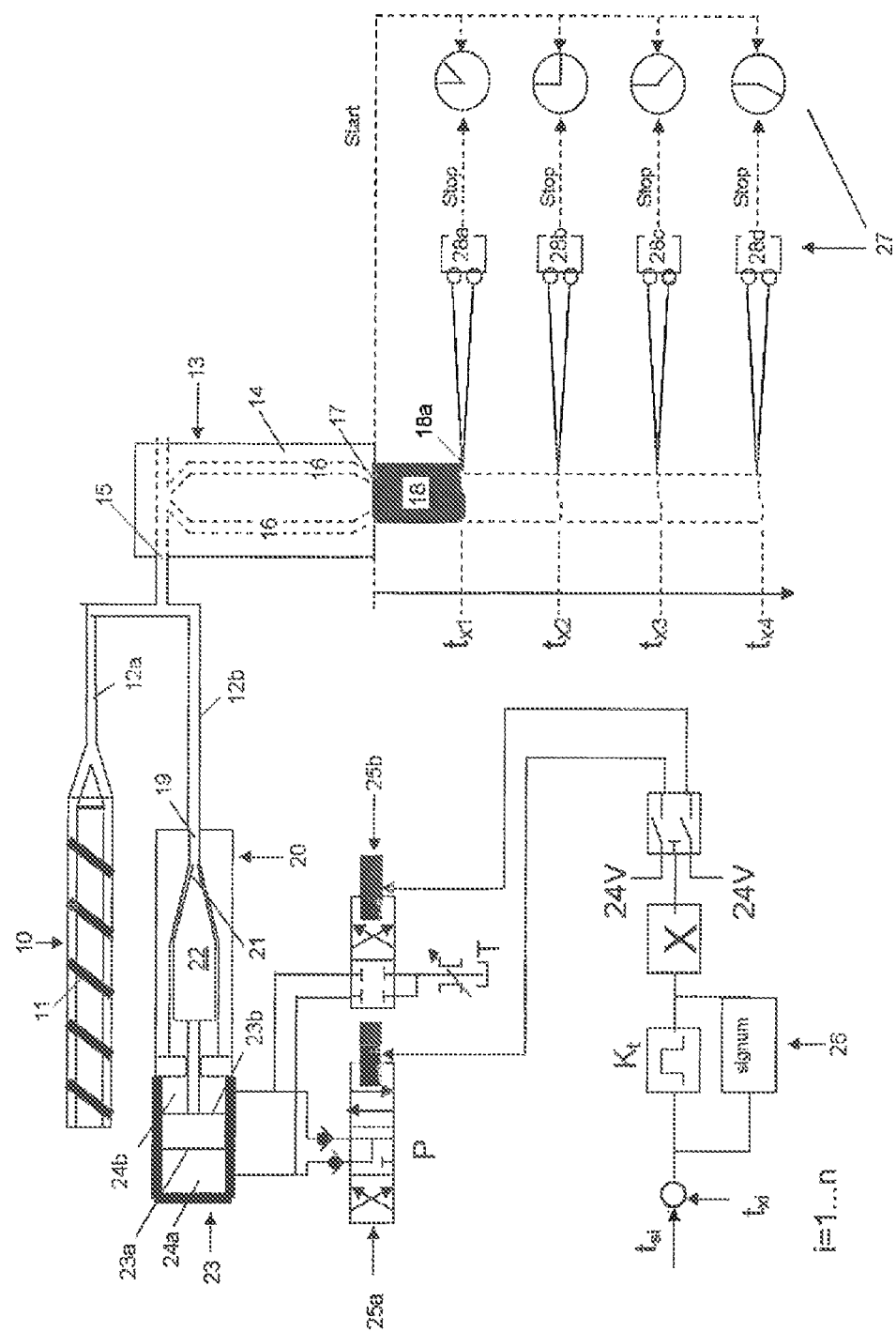

EXTRUSION BLOW-MOLDING METHOD AND DEVICE FOR THE PERFORMANCE THEREOF

CROSS-REFERENCE TO RELATED APPLICATIONS

This application is a 371 of PCT/EP2013/075127 filed Nov. 29, 2013, which in turn claims the priority of DE 10 2012 112 110.9 filed Dec. 11, 2012, the priority of both applications is hereby claimed and both applications are incorporated herein by reference.

BACKGROUND OF THE INVENTION

The invention pertains to an extrusion blow-molding method and to a device for performing an extrusion blow-molding method.

In an extrusion blow-molding method, thermoplastic material is plasticized in an extruder to form a melt and conveyed under pressure to a head. The parison leaves the outlet of the head continuously at a certain delivery speed. The blow mold, usually located underneath the head, receives the parison, which is in the shape of a tube hanging from the head. The tube is expanded in the blow mold to obtain the finished hollow body. After extrusion of a given length of the parison, a cutting device, for example, is used to separate the parison underneath the outlet of the head. A separated parison can also be transferred to the blow mold by means of a handling unit.

For the production of satisfactory hollow bodies such as bottles or canisters, it is necessary for the parison leaving the head to comprise a minimum length. At the same time, the parison may not exceed a certain length, because otherwise more material than necessary is consumed. Another reason why it is necessary to maintain the correct length of the parison is that, in modern extrusion blow-molding methods, the wall thickness of the parison is often controlled automatically by a predefined program.

During the extrusion blow-molding method, fluctuations occur in the viscosity, in the conveying rate, in the regenerate, in the material, and in the bulk density. As a result of these fluctuations, it is impossible to prevent parisons of different lengths from being extruded during the various blow-molding cycles. If the length exceeds the nominal length, too much waste is generated. If the length falls below the nominal length, it is possible that rejects will be produced. There is also the danger that, when the wall thickness is controlled automatically by a parison programming device, the areas with certain wall thicknesses will not be in their correct positions relative to the blow mold receiving the extruded parison.

It is known from DE 25 44 171 A that a light barrier can be set up underneath the blow mold; as soon as the extruded tubular parison has reached the nominal length, its bottom end interrupts this barrier. If the time required to reach the nominal length is less than the nominal time in which, if the extruder is operating with absolute regularity, the tubular parison achieves its nominal length, the extruder is operating too fast. In this case, a control unit decreases the rotational speed of the screw. If the time needed to achieve the nominal length exceeds the nominal time, the extruder is operating too slowly. In this case, the control unit increases the rotational speed of the screw of the extruder, insofar as the amount by which the nominal time is exceeded lies outside the planned tolerance range. At the time the parison is detected by the light barrier, it then has a length corresponding to the nominal length. This makes it possible to prevent rejects from occurring as a result of parisons which are too short. Changes in the extrusion rate by adjustments to the screw rotational speed, however, do not go into effect until the next blow-molding cycle. This known device therefore does not make it possible to avoid fluctuations in the extrusion rate and thus in the time available to extrude a tubular parison. Considerable waiting times within a blow-molding cycle are therefore required to carry out the extrusion blow-molding method.

It is known from DE 25 44 609 A, furthermore, that the gap width of the outlet of the head can be adjusted as a function of changes in the length of the parison.

A method of the class in question for the blow-molding of hollow bodies is known from DE 10 2004 015 719 B4. The method comprises an automatic control . . . pointed out, which corrects the extrusion rate in such a way that the parison assumes a previously determined position in the blow mold. The automatic control method is based on a wall thickness program, which acts on the width of the die gap in the critical cross-sectional areas, wherein the automatic control circuit compares the actual weight of a proportionally divided bottom waste slug and/or of the proportionally divided hollow body with a corresponding nominal weight value. The position of the following parison is then adjusted as a function of the nominal-actual weight value comparison through a change in the width of the die gap and/or of the rpm's of the extruder screw.

To prevent the parisons from sticking or welding together after a parison has been cut off, it is proposed in EP 1 354 692 A1 that the delivery of the parison from the die of the die head be briefly interrupted during the process of separating the individual parisons from each other. To interrupt this delivery process, the melt is preferably diverted from the extruder into a melt accumulator. The melt being stored temporarily during the continuous extrusion process can be added back into the melt being fed to the die head again after the interruption. The melt accumulator is controlled on the basis of flow resistance, which is determined by the distance to the accumulation space of the melt accumulator and the distance to the die head.

BRIEF SUMMARY OF THE INVENTION

Against the background an object of the present invention is to provide an extrusion blow-molding method of the type described above in which the variations in the length of the parisons are minimized. In addition, another object is to minimize the amount of melt required per blow-molding cycle. Yet another object of the present invention is to provide a device for carrying out the extrusion blow-molding method according to the invention.

The objects are achieved on the basis of the idea of influencing the length of the parison being produced during a blow-molding cycle while the current blow-molding cycle is still in progress.

In detail, in the case of an extrusion blow-molding method of the type described above, the goal is achieved by means of the additional steps:

detecting the delivery speed of the parison leaving the outlet;

controlling a melt accumulator to receive a portion of the melt conveyed by the extruder or to discharge previously received melt for addition to the melt conveyed by the extruder as a function of the detected delivery speed during the delivery phase of the parison and prior to its separation; wherein the melt accumulator discharges melt when the detected delivery speed is less than a nominal value for the delivery speed, and the melt accumulator receives melt when the detected delivery speed is greater than the nominal value for the delivery speed.

A blow-molding cycle for producing a molded article comprises the shaping of the melt in the head, the delivery of the parison from the outlet of the head, and the separation of the parison after its delivery. During this blow-molding cycle, the speed at which the parison leaves the outlet is detected. The melt accumulator is controlled as a function of the detected delivery speed while the current blow-molding cycle is still in progress. The melt accumulator discharges melt previously received during the blow-molding cycle and adds it to the melt conveyed by the extruder when the detected delivery speed is less than a nominal value for the delivery speed. As a result, the delivery speed of the parison, during the current blow-molding cycle, is increased. The nominal value for the delivery speed is the value at which the parison achieves its exact nominal length in the blow-molding cycle in question.

The melt accumulator, meanwhile, receives a portion of the melt conveyed by the extruder when the detected delivery speed of the parison is greater than the nominal value for the delivery speed. As a result, the delivery speed of the parison is reduced while the blow-forming cycle is still in progress.

As a result of the method according to the invention, the reproducibility of the extruded length of the tubular parison, of its weight, and of the axial wall thickness distribution of the parison is improved.

The parison is separated during a blow-molding cycle by cutting it off, for example, underneath the outlet of the head. Another possibility for separating the parison consists in interrupting the delivery of the parison from the head by actuating the outlet.

To guarantee that the melt accumulator is available at all times, especially in cases where successive blow-molding cycles are characterized by excessive or insufficient parison delivery speeds, the throughput of the extruder can be increased or decreased in particular by changing the rotational speed and/or by means of automatic gravimetric throughput control of the plastic granulate supplied to the extruder. The throughput is increased to counter the danger that the melt accumulator will run completely empty as a result of the persistence of delivery speeds which are too low. The throughput is decreased to counter the danger that the melt accumulator will no longer be able to receive any melt as a result of the persistence of delivery speeds which are too high.

To improve the reproducibility of the extruded length of the tubular parison even more, it is provided in one embodiment of the invention that the delivery speed is detected multiple times during delivery and before the separation of the tubular parison. Alternatively, it is also possible to detect the delivery speed continuously during delivery and before the separation of the parison.

If the delivery speed is not being detected continuously, the speed measurement is preferably carried out by measuring the time it takes for a certain distance to be traveled. For this purpose, the time it takes for a partial length of the parison to leave the head prior to separation is measured at least once, preferably several times. The partial length is a percentage of the nominal length of the parison. What is measured is, for example, the time it takes for 20%, 40%, 60%, and 80% of the nominal length of the parison to leave the head. For this purpose, light barriers are arranged at appropriate positions underneath the head; these barriers are interrupted by the bottom end of the parison emerging from the opening of the die head.

If the melt accumulator is operated hydraulically, the control unit can actuate it by means of directional valves or proportional valves. An accumulator operated by an electric motor such as a linear motor is actuated in particular by way of an electronic switching element.

In a variant of the method according to the invention, the size of the outlet of the head is also changed during the delivery of the parison. As a result, the wall thickness of the parison can be automatically controlled on the basis of a preset program. This is done in particular by changing the gap width of the outlet. A larger gap width leads to an increase in wall thickness, a smaller gap width to a decrease in wall thickness. In this way, it is possible to provide the parison with different wall thicknesses over its length, wherein the position of the individual wall thickness areas of the parison is adapted to the requirements dictated by the hollow body to be produced. Obviously, it is also possible within the scope of the invention to adjust the basic gap of the die opening in such a way as to achieve additional regulation of the parison. The regulation achieved by setting the basic gap is preferably not conducted until after the extrusion blow-molding method has settled into steady-state operation with respect to wall thickness, weight of the article, and cycle time.

A melt accumulator, configured as a separate assembly, and the extruder are preferably connected by a pipeline to the inlet of the head.

The melt accumulator can be configured as a LIFO, preferably, however, as a FIFO accumulator. The advantage of a FIFO accumulator is that the residence time of the melt in the melt accumulator is made more uniform. The various periods of thermal load to which the melt is subjected in a LIFO accumulator can, during the further processing of the plastic melt to obtain the finished hollow body, lead to impairments of the mechanical properties and/or appearance of the product. The structure of a FIFO accumulator adapted to a device for carrying out the extrusion blow-molding method is known in and of itself to the person skilled in the art in the field in question and can be derived from, for example, DE 42 26 467 C1. The structure of a LIFO accumulator adapted to a device for carrying out the extrusion blow-molding method is known in and of itself to the person skilled in the art in the field in question and can be derived from, for example, DE 102 17 311 A1.

In another embodiment of the device according to the invention for carrying out the extrusion blow-molding method, the melt accumulator can be configured as an integral component of the extruder, as is the case with, for example, reciprocating-screw extruders. The structure of a reciprocating-screw extruder is known in and of itself to the person skilled in the art in the field in question and can be derived from, for example, DE 1 554 968 A.

Finally, the melt accumulator can be configured as an integral part of the head. A head with integrated FIFO melt accumulator is known to the person skilled in the art in the field in question from, for example, DE 1 704 791 A. The head comprises a housing, an inlet for the melt, a core, an annular gap through which melt leaves, and an accumulation space, which can be emptied by an annular piston. The melt emerges discontinuously through the annular gap, namely, under the action of the annular piston, which empties the accumulation space. Some of the melt forming the parison also originates directly from the extruder connected to the inlet of the head, the extruder operating continuously during the delivery of the parison. As a result, the melt accumulator contained in the head can also discharge melt and add it to the melt conveyed by the extruder as a function of the detected delivery speed of the melt or receive into the accumulation space a portion of the melt conveyed by the extruder.

To detect the time it takes for a partial length of the parison to leave the head, the measuring device comprises at least one switching sensor. The switching sensor, as previously mentioned, is in particular a component of a light barrier. Alternatively, the switching sensor could also be a component of an ultrasound barrier or microwave barrier.

In addition to the calculation-based method for determining speed by measuring the time it takes for a certain distance to be traveled, it is also possible to measure the speed on the basis of certain physical effects such as the Doppler effect. When sound, microwaves, or laser beams are reflected by an object, the echo has a higher frequency when the object is moving toward the observer. This frequency difference based on the Doppler effect can be evaluated to determine the speed of the emerging parison.

A line-scan camera can also be used to measure the speed. The single photosensitive linear array, the so-called line scan sensor (de.wikipedia.org/wiki/Zeilensensor), is preferably aligned with the delivery direction of the parison so that it's a delivery speed can be detected.

In cases where the extrusion blow-molding method according to the invention is to be combined with trend-based gap control, the outlet of the head can be adjusted by means of a core, which can move axially in the head. The bottom end of the core represents an inner boundary of an annular gap, the outer boundary of which is formed by the housing of the head.

BRIEF DESCRIPTION OF THE DRAWINGS

An exemplary embodiment of the invention is illustrated in the drawing:

FIG. 1 shows a diagram of a device for producing hollow bodies out of thermoplastic material by the extrusion blow-molding method.

DETAILED DESCRIPTION OF THE PREFERRED EMBODIMENTS

The device schematically illustrated in FIG. 1 comprises an extruder 10, a screw 11 of which is driven by a motor (not shown). The plastic granulate is supplied to the extruder 10 through a hopper (not shown). The supplied plastic granulate is plasticized in the extruder 10 and conveyed through a pipeline 12a to the head 13.

The housing 14 of the head 13 is provided with an inlet 15 for the melt coming from the extruder 10; after it has passed through the inlet 15, the melt flows through a channel 16, which leads to an annular outlet 17 at the bottom of the head 13, from which the melt emerges continuously as a tubular parison 18.

A melt accumulator 20 is connected to the pipeline 12a, at a point between the extruder 10 and the head 13, by means of another pipeline 12b. The melt accumulator 20 comprises an accumulation space 21, which tapers conically down toward its outlet 19; in this space, an appropriately shaped melt piston 22 moves back and forth. The melt piston 22 is connected to a double-acting hydraulic cylinder 23 by a piston rod; the piston 23 of the hydraulic cylinder, with its two opposite surfaces 23a, 23b, makes it possible for the melt piston 22 to move and thus act in two opposite directions. The working spaces 24a, 24b of the double-acting hydraulic cylinder 23 can be supplied with a working medium, usually a hydraulic fluid, through directional valves 25a, 25b. The directional valves 25a, 25b are actuated electrically. For this purpose, the control connections of the directional valves 25a, 25b are connected to a control unit 26, the function of which is explained further below.

Underneath the head 13, a blow mold (not shown in FIG. 1) consisting of at least two parts is arranged. A device for supplying a pressure medium, by means of which the parison 18 in the closed blow mold is expanded into the desired molded article, is assigned to this blow mold, but for the sake of clarity it is not shown in the drawing either.

Underneath the head 13, furthermore, a measuring device 27 is installed to detect the delivery speed of the parison 18 leaving the outlet 17 of the head 13. In the exemplary embodiment shown here, the measuring device comprises a total of four switching sensors in the form of light barriers 28a-d, which, in the exemplary embodiment, are configured as reflection-type light barriers. The light signal originating from the matter of the reflection light barrier is reflected from the bottom end 18a of the parison A itself. The emitters and the receivers of the reflection light barriers are set up parallel to each other in a common housing. The light barriers 28a-d are set up at various distances from the outlet 17 of the head 13 and are stationary.

The way in which the extrusion blow-molding method works is explained in greater detail in the following.

In the extruder 10, the thermoplastic material is plasticized into a melt and conveyed by the extruder 10 through a pipeline 12a to the head 13. Melt also flows through the pipeline 12b to the melt accumulator 20 and fills its accumulation space 21, which holds a portion of the melt plasticized and conveyed by the extruder 10.

In the head 13, the melt is formed into a tubular parison 18 in the channel 16. The parison 18 emerges from the outlet 17 of the head 13, wherein the parison 18 enters the blow mold (not shown).

While the parison 18 is being extruded to its nominal length, the measuring device 27 measures the time it takes for the different partial lengths of the parison 18 to emerge, these measurements being made at the points defined by the positions of the light barriers 28a-d. A "partial length" is the length of the parison 18 between the outlet 17 and its bottom end 18a at the time when one of the light barriers 28a-d is interrupted. The results of the time measurements, namely, the times $t_{x1}$-$t_{x4}$, are compared in the control unit 26 with previously determined nominal times $t_{s1}$-$t_{s4}$, which are required to reach the measurement points defined by the position of the light barriers 28a-d when the extruder 10 is operating in an absolutely uniform manner. If the measured time $t_{xi}$ is less than the nominal time $t_{si}$, this means that the delivery speed is too high. If the measured time $t_{xi}$ is greater than the nominal time $t_{si}$, this means that the delivery speed is too low.

If the detected delivery speed is too low, the melt accumulator 20 discharges previously stored melt and adds it to the melt conveyed by the extruder 10. As a result, the delivery speed of the parison 18 is increased during the current blow-molding cycle. If the detected delivery speed is too high, the melt accumulator 20 accepts some of the melt plasticized and conveyed by the extruder 10 back into its accumulation space 21. As a result, the delivery speed of the parison 18 is decreased during the blow-molding cycle currently in progress.

The deviation from the nominal value is converted in the control unit 26 into a pulse of variable duration ($K_t$) and variable sign and is transmitted to the directional valves 25a, b. So that melt will be discharged from the melt accumulator 20 and added to the melt conveyed by the extruder, the pulse brings both the 4/3-way valve 25a and the 4/2-way valve 25b into the switch position on the right, as a result of which the piston surface 23a is actuated by the pressure source P, and the working space 24b is connected to the tank T. The melt piston 22 is thus pushed to the right into the position shown in FIG. 1. To receive a portion of the melt conveyed by the extruder 10, the pulse brings the 4/3-way valve 25a into the switch position on the left and the 4/2-way valve 25b into the switch position on the right. Now the piston surface 23b is actuated by the pressure source P, while the working space 24a is connected to the tank T by the 4/2-way valve 25b. The melt piston 22 moves toward the left, and melt is received into the accumulation space 21.

By virtue of the fact that, during a blow-molding cycle to form the tubular parison 18, the delivery speed of the parison 18 leaving the head 13 is detected and, as a function of the detected delivery speed, the melt accumulator 20 receives a portion of the melt conveyed by the extruder 10 during the blow-molding cycle currently in progress or discharges melt, adding it to the melt conveyed by the extruder 10, the reproducibility of the length, of the weight, and of the wall thickness distribution of the tubular parisons 18 is increased according to the invention.

List of Reference Symbols

| No. | Designation |
|---|---|
| 10 | extruder |
| 11 | screw |
| 12a, b | pipeline |
| 13 | head |
| 14 | housing |
| 15 | inlet |
| 16 | channel |
| 17 | outlet |
| 18 | parison |
| 18a | bottom end of the parison |
| 19 | outlet |
| 20 | melt accumulator |
| 21 | accumulation space |
| 22 | melt piston |
| 23 | hydraulic cylinder |
| 23a, b | piston surfaces |
| 24a, b | working spaces |
| 25a, b | directional valves |
| 26 | control unit |
| 27 | measuring device |
| 28a, d | light barriers |

The invention claimed is:

1. An extrusion blow-molding method, comprising the steps:
   plasticizing a thermoplastic material to obtain a melt in an extruder;
   conveying the melt under pressure from the extruder to a head with an outlet;
   continuously forming the melt in the head into a parison, wherein the melt emerges continuously from the head as the parison;
   delivering the parison from the outlet of the head at a delivery speed;
   detecting the delivery speed of the parison leaving the outlet during said step of delivering;
   separating the parison from the outlet, the parison being formed during a blow molding cycle;
   controlling a length of the parison formed during the blow molding cycle by actuating a melt accumulator to receive a portion of the melt conveyed by the extruder or to discharge previously received melt for addition to the melt conveyed by the extruder as a function of the detected delivery speed during said step of delivering and before the separation of the parison during said step of separating, wherein
   the melt accumulator discharges melt during the blow molding cycle when the detected delivery speed is less than a nominal value for the delivery speed, and
   the melt accumulator receives melt during the blow molding cycle when the detected delivery speed is greater than the nominal value for the delivery speed.

2. The extrusion blow-molding method according to claim 1, wherein the delivery speed is detected multiple times during said step of delivering and prior to the step of separating the parison.

3. The extrusion blow-molding method according to claim 1, wherein the delivery speed is detected continuously during said step of delivering and prior to said step of separating the parison.

4. The extrusion blow-molding method according to claim 1, wherein said step of detecting includes measuring the time ($t_{xi}$) it takes for a partial length of the parison to be delivered.

5. The extrusion blow-molding method according to claim 4, wherein said step of measuring includes interrupting, by a bottom end of the parison, a light barrier.

6. The extrusion blow-molding method according to claim 1, wherein the melt accumulator is actuated hydraulically or by an electric motor.

7. The extrusion blow-molding method according to claim 1, further comprising changing the size of the outlet of the head during the delivery of the parison from the outlet.

8. A device for the production of hollow bodies by blow-molding, comprising:
   an extruder for plasticizing a thermoplastic material to obtain a melt and for conveying the melt;
   a head for continuously forming the melt into a parison with an inlet for the melt and an outlet, through which the parison is delivered so that the melt emerges from the outlet continuously as the parison, wherein the parison is formed during a blow molding cycle;
   a melt accumulator configured to receive a portion of the melt conveyed by said extruder to discharge previously received melt for addition to the melt conveyed by said extruder;
   at least one measuring device for detecting the delivery speed of the parison emerging from the outlet; and
   a control unit controlling said melt accumulator to discharge melt during the blow molding cycle when the detected delivery speed is less than the nominal value for the delivery speed, and controlling said melt accumulator to receive melt during the blow molding cycle when the detected delivery speed is greater than the nominal value for the delivery speed.

9. The device according to claim 8, further comprising pipelines connecting said melt accumulator and said extruder to said inlet of said head.

10. The device according to claim 8, wherein said melt accumulator is an integral component of said extruder.

11. The device according to claim 8, wherein said melt accumulator is configured as a separate assembly.

12. The device according to claim 8, wherein said melt accumulator is configured as an integral component of said head.

13. The device according to claim 8, wherein said measuring device comprises at least one switching sensor to detect a time ($t_{xi}$) it takes for a partial length of the parison to emerge from said head during the blow molding cycle.

14. The device according to claim 8, wherein said outlet of said head is size-adjustable.

\* \* \* \* \*